(12) United States Patent
Stahl et al.

(10) Patent No.: US 9,323,099 B2
(45) Date of Patent: Apr. 26, 2016

(54) MULTI-LAYERED FOIL BODY

(75) Inventors: Rainer Stahl, Nuremberg (DE); Wayne Robert Tompkin, Baden (CH); Harald Walter, Horgen (CH)

(73) Assignees: LEONHARD KURZ STIFTUNG & CO. KG., Furth (DE); OVD KINEGRAM AG, Zug (CH)

( * ) Notice: Subject to any disclaimer, the term of this patent is extended or adjusted under 35 U.S.C. 154(b) by 201 days.

(21) Appl. No.: 14/131,314

(22) PCT Filed: Jun. 26, 2012

(86) PCT No.: PCT/EP2012/062298
§ 371 (c)(1),
(2), (4) Date: Apr. 16, 2014

(87) PCT Pub. No.: WO2013/004541
PCT Pub. Date: Jan. 10, 2013

(65) Prior Publication Data
US 2014/0218663 A1    Aug. 7, 2014

(30) Foreign Application Priority Data
Jul. 7, 2011    (DE) .................. 10 2011 107 421

(51) Int. Cl.
*G02F 1/1335*    (2006.01)
*G02B 26/02*    (2006.01)
(Continued)

(52) U.S. Cl.
CPC .......... *G02F 1/133514* (2013.01); *B42D 25/00* (2014.10); *B42D 25/29* (2014.10);
(Continued)

(58) Field of Classification Search
CPC ............ G02F 1/1334; G02F 1/133514; G02F 1/133553; G02F 1/13476; G02F 1/13718; G02F 1/133305; G02F 1/1335; G02F 1/133606; G02F 1/0102; G02F 1/133; G02F 1/13306; G02F 1/133365; G02F 1/13342; G02F 1/133602; G02F 1/23; G02F 2001/136222; G02F 2001/13775; G02F 2001/133562; G02F 2201/52; G02F 2202/022; G02F 2203/01; G02F 2203/03; G02B 6/02; G02B 6/0055; H01L 41/047; H01L 51/0097; G09G 3/36; G09G 3/3406; G09G 3/3413; G09G 2380/02; G09G 2300/0486; C09K 19/544; G09F 9/372; G09F 9/302; G09F 9/35; G09F 19/14; F21V 7/00; B29D 11/00788; B29D 11/00894; B41M 3/14; B42D 2033/04; B42D 2033/06; B42D 2033/08; B42D 2033/20; B42D 2033/26; B42D 2033/46; B42D 2035/24; B42D 25/00; B42D 25/29; G03F 7/0007
USPC ............... 349/86, 106, 33, 108, 113, 183, 88; 345/592, 211, 87, 88
See application file for complete search history.

(56) References Cited

U.S. PATENT DOCUMENTS 6,016,178 A * 1/2000 Kataoka ............... G02F 1/13363
349/106

(Continued)

FOREIGN PATENT DOCUMENTS

| DE | 102007048102 | 4/2009 |
|---|---|---|
| JP | H07152029 | 6/1995 |
| JP | 2002072197 | 3/2002 |
| JP | 2005208309 | 8/2005 |
| WO | WO 03/059643 | 7/2003 |
| WO | WO 2008/083921 | 7/2008 |

(Continued)

*Primary Examiner* — Thoi Duong
(74) *Attorney, Agent, or Firm* — Hoffman & Baron, LLP

(57) ABSTRACT

The invention relates to a multi-layered foil body (1) for marking a security document, in particular a banknote. The foil body (1) has at least one color filter layer (2) and at least one change layer (4) with an electrically controllable transmittance and/or an electrically controllable color.

16 Claims, 15 Drawing Sheets

(51) Int. Cl.
  *G02F 1/01* (2006.01)
  *B42D 25/29* (2014.01)
  *B42D 25/00* (2014.01)
  *G02F 1/1334* (2006.01)
  *B41M 3/14* (2006.01)
  *B42D 25/328* (2014.01)

(52) U.S. Cl.
  CPC ............. *G02B 26/02* (2013.01); *G02F 1/0102* (2013.01); *G02F 1/133516* (2013.01); *B41M 3/14* (2013.01); *B42D 25/328* (2014.10); *B42D 2033/04* (2013.01); *B42D 2033/06* (2013.01); *B42D 2033/08* (2013.01); *B42D 2033/20* (2013.01); *B42D 2033/26* (2013.01); *B42D 2033/46* (2013.01); *B42D 2035/24* (2013.01); *G02F 1/1334* (2013.01)

(56) References Cited

U.S. PATENT DOCUMENTS

| | | | |
|---|---|---|---|
| 6,515,729 B1* | 2/2003 | Hoshino | G02F 1/133305 349/113 |
| 7,102,823 B2 | 9/2006 | Schilling et al. | |
| 2002/0047965 A1 | 4/2002 | Suzuki et al. | |
| 2002/0085147 A1* | 7/2002 | Ko | G02B 5/201 349/106 |
| 2005/0162576 A1 | 7/2005 | Sasaki et al. | |
| 2010/0277441 A1 | 11/2010 | Stahl et al. | |
| 2012/0038852 A1* | 2/2012 | Jang | G02F 1/1334 349/86 |

FOREIGN PATENT DOCUMENTS

| WO | WO2008089042 | 7/2008 |
|---|---|---|
| WO | WO 2009/043482 | 4/2009 |

* cited by examiner

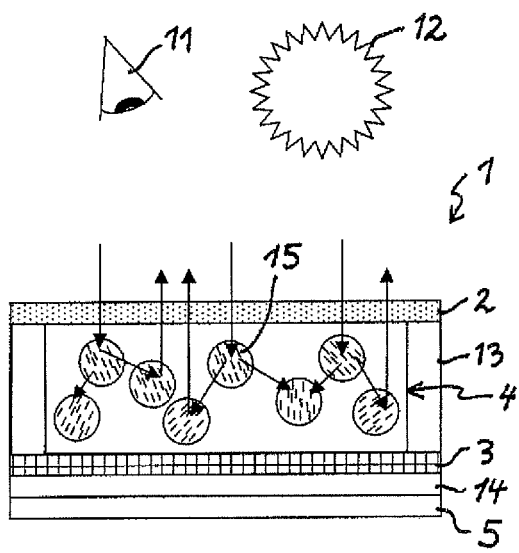 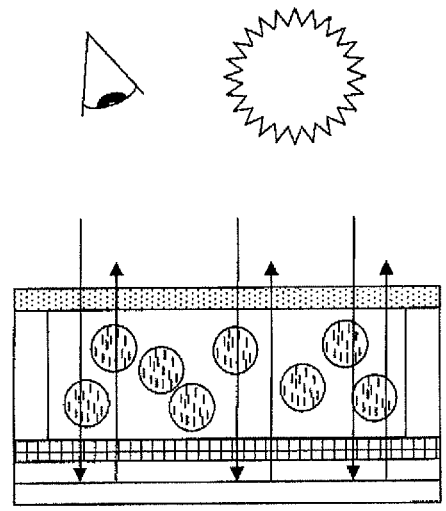
FIG. 2a    FIG. 2c
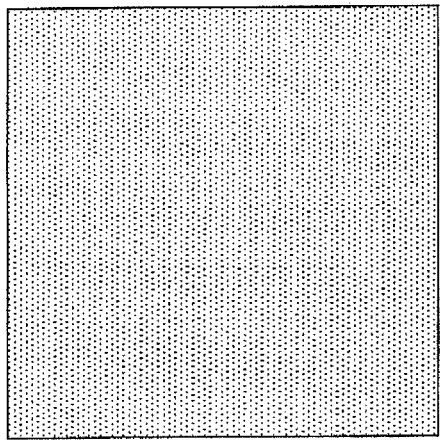 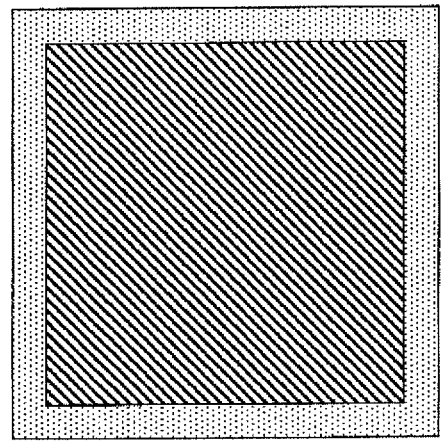
FIG. 2b    FIG. 2d

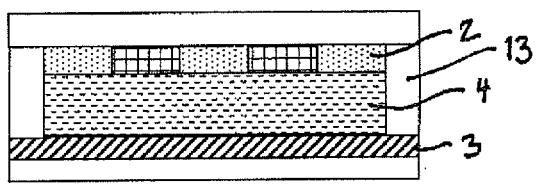
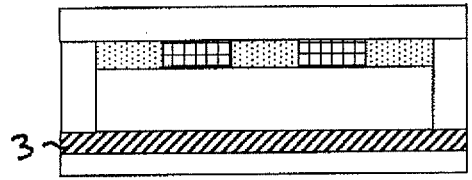
FIG. 4a  FIG. 4c
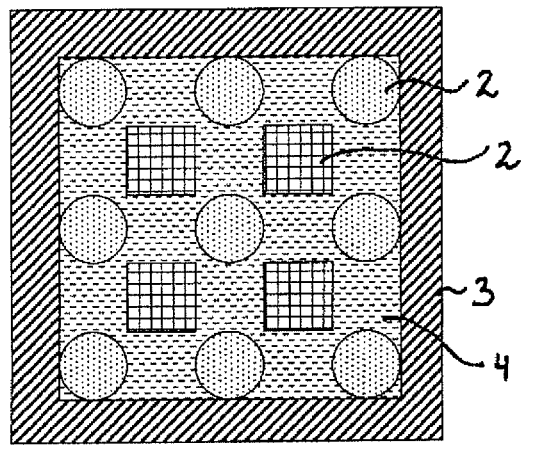
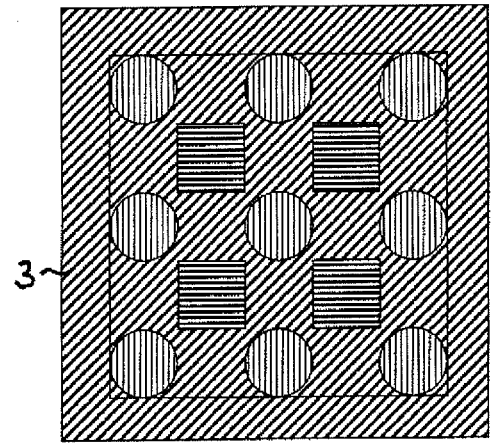
FIG. 4b  FIG. 4d

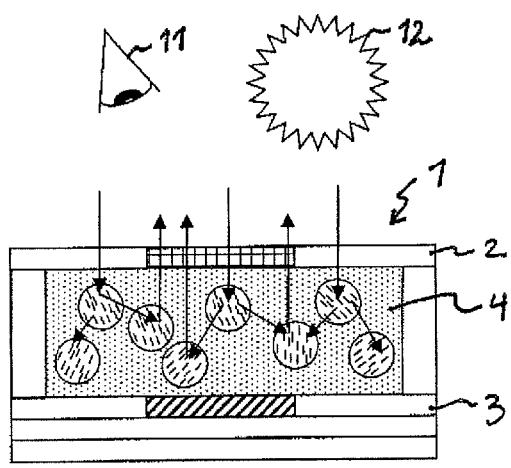
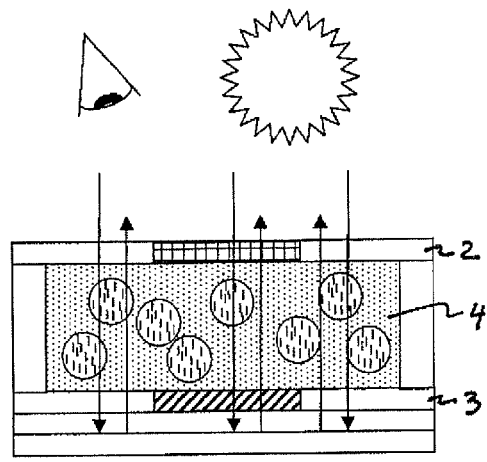
FIG. 8a  FIG. 8c
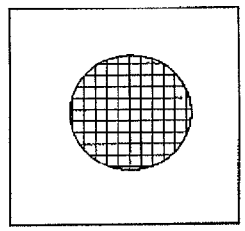
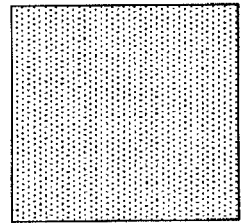
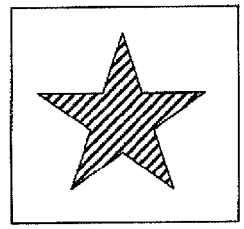
FIG. 8e  FIG. 8f  FIG. 8g
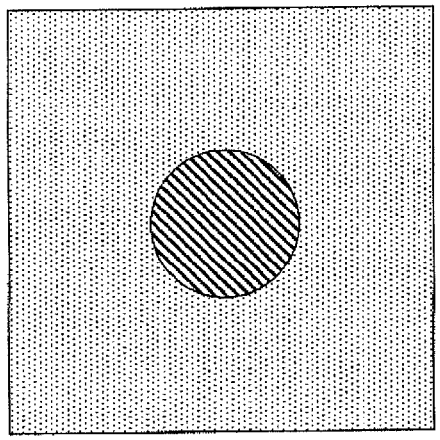
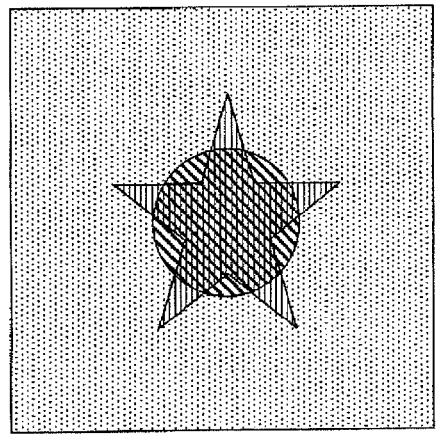
FIG. 8b  FIG. 8d

MULTI-LAYERED FOIL BODY This application claims priority based on an International Application filed under the Patent Cooperation Treaty, PCT/EP2012/062298, filed on Jun. 26, 2012, and German Application No. DE 102011107421.3, filed on Jul. 7, 2011.

BACKGROUND OF THE INVENTION

The invention relates to a multi-layered foil body, a security element with at least one foil body, a security document with at least one foil body, a transfer foil with at least one foil body as well as a method for producing a multi-layered foil body.

WO 2009/043482 A1 describes a security element for the identification of a security document such as a banknote. The security element has a multi-layered foil body with a PDLC layer which reversibly changes from a scattering state into a transparent state when an electric field is applied (PDLC=Polymer Dispersed Liquid Crystal). This change in transmission is controlled by a piezoelectric energy source of the security element: when a piezoelectric material of the energy source is bent, an electric voltage is produced which is applied to electrodes on both sides of the PDLC layer in order to thus generate the electric field.

The variations in optical appearance that can be produced by such a security element are often difficult to see under unfavorable light conditions and not conspicuous enough for the "man on the street". The level of protection against forgery that can be achieved therewith is thus relatively limited.

WO 2008/083921 A1 relates to a value or security document with an optical transmitter. In addition to a visually perceptible signal, a visually imperceptible signal is to be emitted.

For this, in one embodiment there is a monochrome liquid crystal display, to which an infrared filter is connected upstream. In this embodiment, a reflector is provided, in front of which a polarizer is arranged. On a substrate with a transparent back electrode there is a liquid crystalline layer, on which, for its part, there is a structured electrode, and the structured electrode comprises picture elements (pixels).

In a modification of this embodiment, a colored representation is additionally made possible. Each picture element (pixel) comprises three subpixels for respective color components, blue, green and red. A further subpixel serves to emit a machine-readable signal in a visually imperceptible spectral range. The subpixels comprise partial electrodes, in front of which there are corresponding color filters that define the properties of the subpixel.

DE 10 2007 048 102 A1 describes a security element with a piezoelectric energy source that controls a change layer.

SUMMARY OF THE INVENTION

The object of the invention is now to provide an optically variable security feature with an improved optical appearance.

The object is achieved by a multi-layered foil body for marking a security document, in particular a banknote or an ID document, which has at least one color filter layer and at least one change layer with an electrically controllable transmittance and/or an electrically controllable color, which layers at least partially overlap each other, with the result that when the transmittance and/or the color is changed by electric control a change in the color impression for an observer of the security document takes place. According to the invention, the foil body comprises two differently colored color filter layers and a change layer arranged therebetween with an electrically controallable transmittance.

The object is also achieved by a security element with at least one foil body according to the present invention and at least one energy source which controls the change layer and which can be for example a piezoelectric energy source with at least one layer of piezoelectric material. The object is further achieved by a security document, in particular a banknote, with at least one foil body according to the present invention The object is also achieved by a transfer foil with at least one foil body according to the present invention wherein the at least one foil body is arranged on a carrier foil of the transfer foil and can be detached from the latter. And the object is achieved by a method for producing a multi-layered foil body according to the present invention, wherein the color filter layer and/or the at least one change layer of the foil body is formed by printing, preferably onto a carrier foil.

The invention is based on the fact that color shifts in an optical display, and colors quite generally, can be recognized very well even by laypeople and can be easily explained or communicated to laypeople. Security features with changing color elements thus provide security documents with a higher level of protection against forgery than security features which display only a change between bright and dark. Striking color shifts can be realized by the superimposition of color filters and alternating scattering or transparent layers. Depending on the optical switch state of the change layer, scattering or transparent, an observer sees either a color combination of the upper color filter layer and the change layer or a color combination of the upper and lower color filter layers and the change layer. For a designer of security features, the present invention results in a great freedom of design, and a high recognition value of a security element with the foil body according to the invention results for the "man on the street".

By "color" is meant any color that can be represented in a color model such as e.g. the CMYK color model (C=cyan; M=magenta; Y=yellow; K=black) as a "color" dot within a color space. A preferably electric control of the change layer can thus bring about a change in the color of the change layer from a first "color" dot to a second "color" dot. Depending on the mode of operation of the change layer, a change in the color of the change layer can also be realized as a change in contrast of the change layer, e.g. from white to black, from white to red, or from bright red to dark red and/or as a change in the color intensity of the change layer, e.g. from bright red to dark red. A change in the color of the change layer can also bring about a change in the transmittance of the change layer, and vice versa. A change in the color of at least a portion of the foil body from a first "color" dot to a second "color" dot within a color space can thus be perceptible for an observer as a result of a combination of at least one color filter layer and the at least one change layer.

The present invention provides a possibility of adding color effects to a PDLC display. This results in the advantage that the optical effect of a conventional PDLC transmission change has a more conspicuous and more striking appearance.

The color shift of the foil body is preferably based on subtractive color mixing with the aid of color filters, wherein the change layer can likewise act as a color filter, e.g. in the case of a colored change layer. The most frequent primary colors for subtractive color mixtures are cyan, magenta and yellow. White light, e.g. sunlight or light from room illumination, usually strikes the foil body. The individual color filters function by selective absorption in relation to the incident white light. If the colors of the color filters are identified by the letters C=cyan, M=magenta and Y =yellow, the following color effects, in each case indicated to the right of the arrow, result when white light is incident on the color filters C, M, Y: C→cyan; M →magenta; Y→yellow; M+Y→red; C+Y→green; C+M→blue, C+M+Y→black=complete absorption of the incident light.

Where "lower" or "upper" layers are mentioned below, this means the relative position in relation to an observer of the foil body, in particular applied to a substrate, for example a security document, being looked at by the observer. In the two color filter layers, provided according to the invention in the foil body, an "upper" color filter layer is arranged closer relative to an observer than a "lower" color filter layer. If the foil body is designed to be observed from both sides, i.e. does not have a reflective layer and is adapted for arrangement in or over a window of a security document, this denotation of relative position is, if possible, avoided because the relative position in relation to an observer changes depending on the observed side of the foil body. In this case, it is more advantageous to use the terms "first" color filter layer, "second" color filter layer, etc.

If the change layer has an electrically controllable transmittance, the more opaque state of the change layer is called "closed" because the change layer is relatively impermeable to light in this state. The less opaque, or more transparent, state of the change layer on the other hand is called "open" because incident light can pass through the change layer better in this state than in the more opaque state. It is possible that the transmittance of the change layer can be changed, depending on the size of the voltage applied, continuously and freely between two extreme values, i.e. between a minimally light-permeable, i.e. maximally opaque, state with no applied voltage and a maximally light-permeable state with a particular voltage value not equal to zero.

Advantageous embodiments of the invention are described in the dependent claims.

According to a preferred development, the at least one change layer has liquid crystals which can be aligned in an electric field. The liquid crystals are preferably PDLC material. The change layer preferably has a layer thickness of at most 100 µm, in particular of at most 20 µm, particularly preferably of at most 5 µm. In the case of an ID card, the layer thickness of the change layer can be substantially thicker, e.g. in the range of from 20 to 100 µm, preferably about 50 µm, than in the case of a banknote, in which the layer thickness of the change layer preferably does not exceed about 20 µm (ID=identity). The thicker the PDLC layer is, the more effectively it scatters light and, when the change layer is in the closed state, the less visible a color filter lying underneath it is for an observer, i.e. the better the color filter lying underneath it can be hidden from the observer.

The change layer is preferably formed from at least one PDLC layer. However, the use of other materials which change optically under the influence of current or voltage, for example generate a color change or light up, can also be used to form the change layer, such as for example electrochromic materials, layer systems for forming light-emitting diodes, in particular organic light-emitting diodes, or electrophoretic display elements. The use of PDLC layers makes a simple combination with in particular piezoelectric energy sources possible because their power values can be attuned to each other well. Other possible energy sources are e.g. solar cells, in particular organic solar cells producible by means of printing technologies, batteries, capacitors, or one or more antenna elements, which can generate electrical signals by other electromagnetic fields acting on the antenna elements, wherein these electrical signals have the current and/or voltage values necessary for switching the change layer. Such antennae function analogously to the antennae known from RFID systems (RFID=Radio Frequency Identification). These energy sources are preferably present combined with the change layer in the form of a security element. It is preferred if these energy sources, in particular a solar cell or an antenna, are embedded in a foil, preferably in the multi-layered foil body ("in-foil" elements).

According to a preferred development, the multi-layered foil body has two electrodes between which at least a part of the change layer is arranged. It is particularly preferred if the two electrodes are formed as an upper and a lower electrode layer, which are arranged above or below the change layer respectively. An electric field, which serves to control the transmittance and/or the color of the change layer, is produced by applying a voltage to the two electrodes in the space between the electrodes. The electrodes, in particular the electrode layers, are formed at least in areas. The electrodes are electroconductively connected to an energy source which can provide an electric voltage. The control of the transmittance and/or the color of the change layer can take place by an intentional act of a user, e.g. by bending a piezoelectric energy source or actuating a button thereby triggering an application of an electric voltage to the change layer, or can be triggered without deliberate cooperation of a user by environmental influences, e.g. by unknown passing of an RF field (RF=Radio Frequency) or by incidence of light on a solar cell thereby triggering an application of an electric voltage or the electric or electromagnetic field forming thereby to the change layer.

The at least one change layer is preferably formed from at least one PDLC layer, preferably from at least one PDLC film. PDLC films, which are used among other things as so-called "smart glass", display a rapid electro-optical response behavior, typically have no leakage loss, function without the use of a polarizer and are relatively easy to produce. PDLC films consist of a large number of liquid is crystal droplets (=LC droplets; LC=Liquid Crystal) with dimensions in the micrometer range, e.g. 0.05 µm to 5 µm, which are embedded into a polymer matrix. The LC droplets display electrical anisotropy and double refraction. If no electric field is applied (closed or switched-off state of the PDLC film), the PDLC film strongly scatters incident light at the boundary surface of polymer and LC because of the different refractive indices of the liquid crystals and of the polymer. A milky-cloudy appearance of the PDLC film results. The opacity, i.e. the opaqueness, of the PDLC film is dependent on its thickness, i.e. on the amount of the LC material, present in the form of LC droplets, along the viewing direction, depending on the density or the proportion of the LC droplets in the polymer matrix and depending on the temperature. The thicker the material layer is, the higher the opacity is. The higher the proportion of the LC droplets in the polymer matrix is, the higher the opacity is. The higher the temperature is, the higher the opacity is, in particular because of the stronger Brownian motion of the LC droplets in the polymer matrix.

In an electric field, the LC droplets align in the direction of the electric field lines, and the refractive index of the liquid crystals corresponds to that of the polymer, with the result that the PDLC film no longer has a scattering effect, but appears transparent (=open or switched-on state of the PDLC film). Optical switch elements which have only small layer thicknesses and withstand mechanical stresses such as bending or folding can be realized with liquid crystals, which can be aligned in an electric field, because of the change between scattering and transparent state. They are therefore suitable in particular for uses on security documents such as e.g. banknotes or ID documents, such as e.g. smart cards or passports.

The thickness of a PDLC film display with color filters is compatible with requirements which are made of security documents such as banknotes or ID documents. A foil body according to the invention with a PDLC film is relatively flexible and is therefore compatible with a use on a security document such as a banknote or an ID document.

According to a preferred development, the PDLC layer is colored. This can take place by adding a dye or a pigment, in particular a nano pigment, in a printable PDLC varnish. In an embodiment of this development, the PDLC layer has the same color as a first color filter layer. The intensity of the color of the first color filter layer can thereby be reduced without altering the color effect when the PDLC layer is open. This results in a further degree of freedom in the design of the color effect. For example, the color contrast between closed and open state of the PDLC layer can thus be optimized.

According to a preferred development, the foil body comprises two differently colored color filter layers and a change layer arranged therebetween with an electrically controllable transmittance. Depending on the optical switch state of the change layer, scattering or transparent, an observer sees either a color combination of the upper color filter layer and the change layer or a color combination of the upper and lower color filter layers and the change layer.

If the change layer is formed by the colored PDLC layer, an observer sees, in the opaque state of the PDLC layer, the color of an upper color filter combined with colored light corresponding to the scattering in the colored PDLC layer. Layers of the foil body arranged underneath the colored PDLC layer are, in the ideal case, not perceived by the observer because no light can penetrate to these lower layers due to the strong scattering of the PDLC layer. When the state of the colored PDLC layer is switched to transparent, on the other hand, a superimposition of the colors of the upper color filter, the colored PDLC layer and one or more layers of the foil body arranged underneath the colored PDLC layer is displayed to the observer.

According to a preferred development, one of the two color filter layers is formed colored in a pattern and the other is formed colored homogeneously over the whole surface. If the foil body comprises two color filter layers and a change layer arranged therebetween with an electrically controllable transmittance, it is advantageous if the upper color filter layer is colored homogeneously over the whole surface and the lower color filter layer is colored in a pattern. In the closed state of the change layer, only a color surface that is homogeneous over the whole surface appears to an observer of the foil body. In the open state of the change layer, on the other hand, a patterned color surface, preferably with a color background different in color to the previously visible color surface that is homogeneous over the whole surface, appears to an observer.

A pattern can quite generally be a graphically designed outline, a grid, a figurative representation, an image, a motif, a symbol, a logo, a portrait, alphanumeric characters, text and the like.

According to a preferred development, a pattern with differently colored pattern elements is formed in at least one of the two color filter layers. It is possible that the lower color filter layer has a pattern with differently colored pattern elements and the upper color filter layer forms a color surface that is homogeneous over the whole surface. In this case, in the closed state of the change layer only a color surface that is homogeneous over the whole surface appears to an observer of the foil body, while in the open state of the change layer the pattern combined with, i.e. placed behind, the color surface that is homogeneous over the whole surface appears. Alternatively, it is possible that the lower color filter layer forms a color surface that is homogeneous over the whole surface and the upper color filter layer has a pattern with differently colored pattern elements. In this case, in the closed state of the change layer only the pattern appears to an observer of the foil body, while in the open state of the change layer the pattern combined with, i.e. superimposed by, the color surface that is homogeneous over the whole surface appears.

According to a preferred development, the foil body has a reflective layer which is arranged behind the at least one color filter layer and the at least one change layer in relation to an observer. This can be a metallic layer, e.g. a vapor-deposited layer of aluminum, copper, silver or gold, or a non-metallic, transparent, semitransparent or translucent HRI layer or HRI layer sequence (HRI=High Refractive Index). In the open state of the change layer, an increase in brightness can be achieved by reflection of incident light rays at the reflective layer. If a transparent, semitransparent or translucent layer is used for the reflective layer, then a color layer arranged, in particular printed, on the substrate can act as a lower color filter layer. In the case of electrode layers arranged above and below the change layer, this assumes that these electrode layers are formed transparent or at least semitransparent, e.g. from ITO (=Indium Tin Oxide).

According to a preferred development, the reflective layer is formed as a metal layer which simultaneously acts as a color filter. Particular metal layers can be active in this way. An example of this design is a copper layer which mainly reflects the red part of the visible spectrum. An alternative example to this is an intrinsically gray-silver aluminum layer to which a red or red-brown translucent varnish layer is applied, which together result in an optical color impression similar to a copper layer. Gray-silver aluminum layers can also be combined with different-colored, transparently translucent varnishes in order to achieve particular metallic-colored optical impressions. A further example is a thin silver layer: Because of plasmon resonances of the spatially contained electron gas, such a thin silver layer has colors which differ from those of a thick layer. For example, a 4-nm thick silver layer which is deposited on a PET film can display a blue color (PET=polyethylene terephthalate). Further examples of reflective layers with at least one metal layer are a reflective color filter in accordance with the Fabry-Perot type (FP filter). Such FP filters can be semitransparent or opaque. FP filters typically consist of three layers: a semitransparent metal layer, a transparent spacer layer and a semitransparent or opaque metallic mirror layer. The color of the FP filter varies greatly with the viewing angle if the spacer layer is a material with a low refractive index, such as e.g. polymers, $MgF_2$ or $SiO_2$. A faint or even invisible color shift can be realized if a material with a high refractive index is used for the spacer layer, e.g. ZnS or $TiO_2$. A color filter which is arranged underneath the change layer in relation to the observer can even act as the lower electrode if this filter layer has an electrically conductive layer, e.g. an aluminum-metallized layer of an FP filter.

According to a preferred development, the foil body has at least one invariable layer. In particular, it can be at least one printed, e.g. opaque, color layer. It is advantageous to form the invariable layer in a pattern, e.g. in the form of a frame for a display layer visible underneath it, comprising the at least one color filter layer and the at least one change layer. If this invariable layer lies on a side of the foil body facing the observer, the observer sees the invariable layer irrespective of the switch state of the change layer. If this invariable layer lies on a side of the foil body facing away from the observer, the observer sees the invariable layer superimposed by the color of the change layer.

The invariable layer can be formed by imprinting, adding or embedding non-variable elements in the foil body. It is advantageous to arrange the invariable layer on the upper color filter. The invariable layer can form an unchanging reference object, e.g. a pattern, symbol, logo. The invariable layer can also be used to form the variable representation lying underneath it or to give it an outline.

It is possible to combine transparent areas, colored areas, opaque, i.e. non-transmitting, colored or metallic patterns, e.g. printer ink or OVI, and demetallized gaps in a metallic OVD (OVI=Optically Variable Ink; OVD=Optically Variable Device).

According to a preferred development, at least one of the at least one color filter layers is formed as a cholesteric LC layer. It is advantageous if the cholesteric LC layer is formed such that when the viewing angle changes said layer changes the hue, e.g. a color shift from green to red. The angle-dependent hue, brought about by interference, of a cholesteric LC layer is particularly visible when a dark background is placed behind the LC layer. In front of a bright background, the hue of a cholesteric LC layer is only poorly visible, practically invisible for the "man on the street". If at least one of the at least one color filter layers is formed as a cholesteric LC layer, it is therefore advantageous if in relation to an observer a dark, i.e. absorbent, or scattering layer is formed behind the cholesteric liquid crystal layer, preferably in the form of a pattern, image, symbol, logo, etc. The area of the cholesteric LC layer behind which the patterned dark or scattering layer is placed is clearly visible in the open state of the change layer as a patterned interference-colored LC layer, whereas areas of the cholesteric LC layer arranged outside of the patterned dark or scattering layer appear only quite faintly colored or completely transparent.

According to a preferred development, at least one of the at least one color filter layers is formed as a diffractive color filter. Examples of such diffractive color filters are zero-order diffraction gratings, also called resonant gratings, which are described e.g. in WO 03/059643 A1. Such zero-order diffraction gratings consist of a high-frequency grating structure and at least one highly refractive waveguide structure. It is also advantageous for diffractive color filters if, in relation to an observer, a dark, i.e. absorbent, or scattering layer is formed behind the diffractive color filter, preferably in the form of a pattern, image, symbol, logo, etc. The area of the diffractive color filter behind which the patterned dark or scattering layer is placed becomes clearly visible in the open state of the change layer as a patterned colored layer, whereas areas of the diffractive color filter arranged outside of the patterned dark or scattering layer appear only faintly colored or transparent.

A dark background layer can be produced e.g. by printing a dark printer ink, e.g. black, dark gray, dark blue, dark green, dark red, on an electrode or on a substrate. It is also possible to form the lower electrode in particular reflective, metallized, by an OVD; in this case the dark pattern can be formed in the form of a diffraction device with a black effect, e.g. as a diffractive cross grating with a period length of the grating structures between 150 nm and 500 nm, preferably between 190 nm and 420 nm, and a grating depth in the range of from 50 nm to about 1000 nm, preferably in the range of from 100 nm to about 500 nm. The upper electrode can likewise be formed in particular reflective, metallized, by an OVD, wherein it is advantageous here to provide the reflective layer, in particular is if it is metallic, only in areas of the surface and in particular to design it particularly delicate, e.g. as fine lines or other graphic elements with small surface coverage in order not to restrict the visibility of the layers lying underneath it. In particular, it is possible to produce a security feature with strongly contrasting properties if the upper electrode has delicate, metallically reflective OVD areas and the color filter layer, supported by a dark background layer, has a color with a color saturation as high as possible.

The optical properties of a cholesteric LC layer and of diffractive color filters can be utilized to make the color of an upper color filter layer practically invisible in the opaque state of the change layer: The relatively faint hue of a cholesteric LC layer or of a diffractive color filter is easier to hide using the change layer that scatters in the closed state than the more intensive hue of another color filter layer.

It is possible that a cholesteric LC layer with a dark background is used as a lower color filter which is practically invisible in the closed state. The dark background can form a pattern. The upper color filter can be either transparent without color or transparent with color, i.e. display another color which mixes with the hue of the cholesteric LC layer in the transparent state of the change layer.

It is also possible that a cholesteric LC layer is used as an upper color filter which is practically invisible in the closed state of the change layer because the background layer formed by the change layer is milky-white. The lower color filter can be formed merely by a dark, preferably black, layer. In the open state of the change layer, the milky-white change layer is no longer placed behind the cholesteric LC layer, but the dark lower color filter layer visible through the now transparent change layer is. The interference color of the cholesteric LC layer is thus clearly visible.

According to a preferred development, the thickness of the change layer varies. It is possible that the change layer has a change in the layer thickness extending is linearly over the width of the layer, or a change in the layer thickness emanating radially from a point, e.g. from a central point to the edges of the change layer. As a thicker area of the change layer requires a longer period of time or a higher electric field in order to change its transmission or color behavior than a thinner area, color changes can be realized in the foil body in this way which alter locally with time and/or with the applied voltage, or depending on their temporal voltage change. For example, a color shift can thus be formed in the form of a wave.

The security document can be for example a banknote, security paper, share, credit card, bank card, cash card, store card, ticket, or an ID document such as an identification card, visa, driver's license, residence document, motor vehicle registration certificate, in particular a smart card or a passport. It is possible that a passport has at least one plastic page, e.g. made of PC (=polycarbonate), a so-called passport data page. ID cards and passport information pages are formed e.g. as bendable plastic cards with a usual thickness in the range of from 0.1 to 1 mm. Such a thick security document is advantageous for a piezo element for generating a voltage. Namely, it has been recognized that the application of a layer of piezoelectric material in a comparatively small layer thickness in the range of up to 30 μm to a security document does not result in a piezoelectric energy source with optimum efficiency under all conditions, unless a suitable rigidity is simultaneously ensured in the area of the energy source. The voltage yield of the layer of piezoelectric material can be adjusted via the rigidity of the composite of security element and security document in the area of the energy source. An adjustment of the rigidity of the composite of security element and security document in the area of the energy source and also of the layer thickness of the layer of piezoelectric material is necessary to the effect that, on the one hand, the electric voltage or field strength at least necessary for switching the change layer must be produced by bending the security document and, on the other hand, the properties of the thin security document must not be altered locally so greatly that the rigidity leads to an impairment of the manipulation or life of the security document. Moreover, it is advantageous if the manipulation of the security document, in particular in the case of bending it to produce the electric voltage or field strength, is sufficiently simple for a large enough range of users.

According to a preferred development, the foil body is arranged at least in areas in a transparent area of the security document. The transparent area can be a through window opening of a security document, e.g. of a paper banknote or a passport page, or an unprinted area of a transparent polymer substrate or a smart card. Through this arrangement, both sides of the foil body are visible for an observer. It is thereby possible that the foil body displays a different optical appearance depending on the viewing direction (observation from the front or back), incidence of light (reflected light or transmitted light) and switch state of the change layer (closed or open).

BRIEF DESCRIPTION OF THE DRAWINGS

The invention is explained below with reference to several embodiment examples with the help of the attached drawings. There are shown, schematically and not to scale, in FIG. 1 a multi-layered foil body, FIG. 2 a first embodiment example of the foil body with two color filters over the whole surface, FIG. 3 a second embodiment example of the foil body with an upper color filter over the whole surface and a lower color filter in a pattern, FIG. 4 a third embodiment example of the foil body with an upper color filter in a pattern and a lower color filter over the whole surface, FIG. 5 a first representation possibility according to the third embodiment example, FIG. 6 a second representation possibility according to the third embodiment example, FIG. 7 a fourth embodiment example of the foil body with an invariable imprint, FIG. 8 a fifth embodiment example of the foil body with a colored PDLC, FIG. 9 a sixth embodiment example of the foil body in which a multi-layered foil body is arranged over a through window of a security document, FIG. 10 a representation possibility according to the sixth embodiment example, FIG. 11 a seventh embodiment example of the foil body in which a multi-layered foil body with a colored PDLC is arranged over a through window of a security document, FIG. 12 foil body without PDLC, FIG. 13 an embodiment example of a the foil body with a cholesteric liquid crystal layer, and FIG. 14 an alternative design of the example from FIG. 13 with a cholesteric liquid crystal layer.

DETAILED DESCRIPTION OF THE INVENTION

Figure 1A:
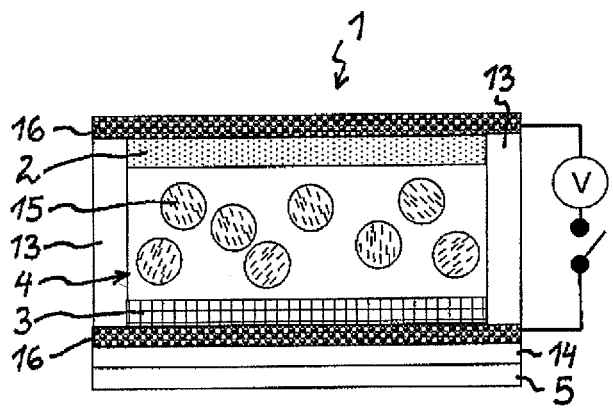

FIG. 1 shows a multi-layered foil body 1 with a first color filter layer 2, a change layer 4 in the form of a PDLC layer, a second color filter layer 3, an auxiliary layer 14 and a reflective layer 5. The foil body 1 can be attached to a substrate e.g. by means of an adhesive layer, wherein the adhesive layer is arranged between the reflective layer 5 and the substrate. Both sides of the PDLC layer 4 are at least partially covered by electrodes 16, i.e. a first and a second electrode layer 16, to which a voltage V can be applied to generate an electric field between the electrodes 16. The upper electrode 16 is preferably transparent, translucent or semi-transparent, e.g. consisting of ITO or of metal areas with small layer thickness, in particular in grid or grating form. The lower and/or upper electrode 16 can have a diffractive surface relief, wherein an electrically conductive metallic or HRI electrode layer acts as optical reflective layer for this.

If the change layer 4 is present in the form of a PDLC layer, it is advantageous to arrange the color filter layers 2, 3 in each case between the change layer 4 and the electrode layers 16. For example, leakage currents through the PDLC layer 4 can thereby be reduced.

The optional auxiliary layer can be e.g. an adhesive layer, a protective layer or a leveling layer.

Furthermore, the foil body 1 has a support layer 13 which, seen perpendicular to the plane of the foil body 1, forms a frame around the PDLC layer 4. Such a support layer 13 contributes to a mechanical stabilization of the PDLC layer 4. In the case of electrode layers 16 not arranged on the same plane, the support layer 13 furthermore contributes to a standardization of the distance between the first and the second electrode layer 16 in the area of the PDLC layer 4, with the result that the electric field is as constant as possible over the area of the PDLC layer 4 and the PDLC layer 4 switches homogeneously over its surface. In addition, a sealing or optical limitation of the PDLC layer 4 and/or an optimization of the adhesion of the second electrode layer 16 can be achieved by means of the support layer 13. The support layer 13 can also serve as a limiting frame for the PDLC layer 4 to be applied in liquid or waxy state, in order that this PDLC layer 4 can be applied, in particular by printing and/or using a doctor blade, locally limited in registration-accurate manner. The support layer 13 is formed electrically insulating in order to prevent an electrical short circuit between the first and the second electrode layer 16. The surface area of the PDLC layer 4 can be formed smaller than, equal to or larger than the area surrounded by the frame 13.

Figure 1B:
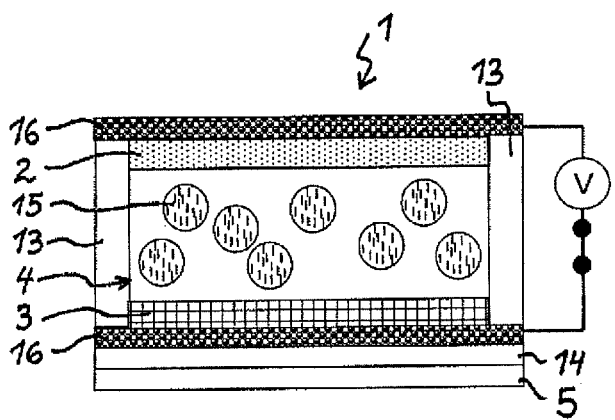

The PDLC layer 4 consists of a polymer medium in which liquid crystal droplets are dispersed. In the PDLC layer 4, the liquid crystal molecules are aligned isotropically on average, i.e. statistically or stochastically arranged uniform in all directions, when no voltage is applied to the electrodes 16. Incident light is scattered by the differences in the refractive index between the liquid crystal and the polymer. As a result, the PDLC layer 4 is milky-white-opaque, as shown in FIG. 1a. In contrast, the liquid crystal molecules are arranged parallel to the electric field, as represented in FIG. 1b, i.e. arranged anisotropically, when a voltage is applied to the electrodes 16 and an electric field is thus present in the PDLC layer 4. Incident light is consequently allowed through the PDLC layer because there are no differences in respect of the refractive index between the liquid crystal and the polymer. As a result, the PDLC layer 4 is transparent.

In the following, an explicit representation of the electrode layers 16 is dispensed with in order to simplify the drawings.

FIG. 2 shows a first embodiment example of the multi-layered foil body 1 with two color filters 2 and 3 over the whole surface, between which a PDLC layer 4 is arranged. An observer 11 looks from above onto the foil body 1, which is illuminated in reflected light with white light from a light source 12. The PDLC layer 4 can be switched between an opaque state as shown in FIG. 2a and a transparent state as represented in FIG. 2c. The opaque state is also called "closed" because the PDLC layer 4 is not transparent in this state. The transparent state is also called "open" because incident light can pass through the PDLC layer in this state. In the closed state, as shown in FIG. 2*a*, i.e. when no voltage is applied to the electrodes, the PDLC layer is scattering and opaque, and scatters incident light in the form of a matt scatter body. In the ideal case, the light is scattered back into the upper half-space and reaches the observer 11. Ideally, only a small proportion of the incident light reaches the lower color filter layer 3 and the reflective layer 5, with the result that the lower color filter layer 3 remains substantially hidden from the observer 11. The proportion of the light which reaches the lower color filter layer 3 in the closed state determines the contrast of the color effect. If the upper color filter layer 2 is yellow for example, the light scattered back to the observer 11 also appears yellow. In order to be able to hide the lower color filter layer 3 even better in the closed state of the change layer 4, it is possible that an additional scatter layer or a gray filter is positioned between the two color filter layers 2 and 3 in order to increase the opacity of the foil body 1. Even if such additional scatter and gray filter layers alter the color of the second color filter 3 in the transparent state of the PDLC layer 4, such an additional scatter or gray filter body can contribute to the optimization of the visual impression of the foil body 1. As already described above, the thickness of the PDLC layer 4 and the density of the LC particles in the PDLC layer 4 also determine its scatter effect and thus its opacity.

White light incident through the first color filter layer 2 is partially absorbed by the first color filter layer 2 according to the laws of subtractive color mixing. The remaining light spectrum is scattered in the PDLC layer 4. Light scattered back to the observer 11 passes through the first color filter layer 2 a second time and, if the upper color filter layer 2 is yellow, likewise brings about a yellow color impression of the foil body 1 for the observer 11.

If voltage is applied to the electrodes on both sides of the PDLC layer 4, the PDLC layer 4 ideally becomes completely transparent. In this case, incident light passes through the color filter layer 2 first. If this color filter layer 2 is yellow, the blue portion of the spectrum is absorbed in the filter 2 and the remaining light only is contains red and green portions. This yellow light can subsequently pass ideally unhindered through the PDLC layer 4 and then passes through the lower color filter layer 3 which is e.g. a cyan filter. The light which passes through the lower color filter layer 3 has thus passed through a combination of a yellow filter 2 and a cyan filter 3 which result in green light when combined. Consequently, the light is green after passing through the first and second color filters 2 and 3 and is reflected at the reflective layer 5 back into the upper half-space of the observer 12. During the repeated passage through the foil body 1, the light thus passes through the two color filter layers 2 and 3 a further time. The light which exits the foil body 1 upwards displays a dark green because it has passed through both color filter layers twice each and thus all light portions of the spectrum other than green have been filtered out particularly thoroughly.

In the closed state of the PDLC layer 4, the foil body 1 thus appears yellow, as shown in FIG. 2*b*. In the open state, on the other hand, the foil body 1 appears yellow only in the area of the edge element 13, while it appears green in the other area, as shown in FIG. 2*d*.

FIG. 3 shows a second embodiment example, based on the layer structure shown in FIG. 2*a*, with an upper color filter 2 colored homogeneously over the whole surface and a lower color filter 3 in a pattern. If the PDLC layer 4 is closed, only the upper color filter layer 2 is visible, whereas in the open state of the PDLC layer 4 a combination of the upper and lower color filter 2 and 3 is visible. FIG. 3*a* shows a yellow upper color filter, FIG. 3*b* shows a lower color filter with a cyan-colored background on which a magenta-colored star is arranged. The upper color filter and the lower color filter together result in the image represented in FIG. 3*c*, in which a red star is arranged on a green background. In the case of such a combination of the color filter layers shown in FIG. 3*a* and FIG. 3*b*, in the closed state of the PDLC layer 4 the yellow appearance shown in FIG. 3*a* thus results and in the open state of the PDLC layer 4 the appearance shown in FIG. 3*c* results.

Figure 3A:
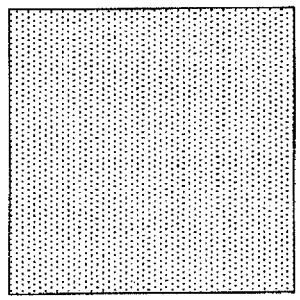
Figure 3B:
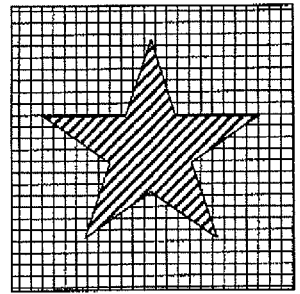
Figure 3C:
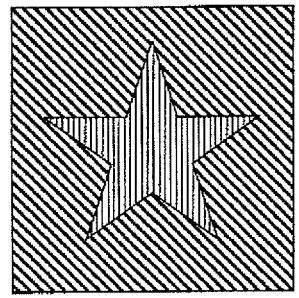
Figure 3D:
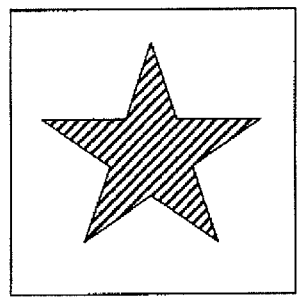
Figure 3E:
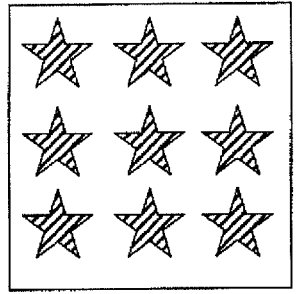
Figure 3F:
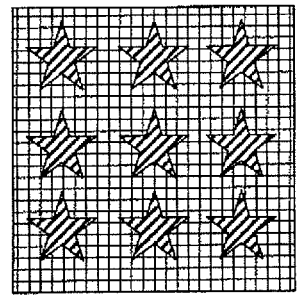

FIGS. 3*d* to 3*f* show further variants for the formation of the lower color filter layer 3. FIG. 3*d* shows a magenta-colored star on a transparent background, FIG. 3*e* shows an arrangement of magenta-colored stars on a transparent background and FIG. 3*f* shows an arrangement of magenta-colored stars on a cyan-colored background. If the upper color filter 2 shown in FIG. 3*a* is now combined with the lower color filters 3 shown in FIG. 3*d* or FIG. 3*e*, in the closed state a yellow surface is visible and in the open state of the PDLC layer 4 a red star or an arrangement of red stars on a yellow background is visible. If, on the other hand, the color filter layer shown in FIG. 3*a* is combined with the color filter layer shown in FIG. 3*f*, similarly to in FIG. 3*c* an arrangement of red stars on a green background is visible if the PDLC is transparent, while in the closed state of the PDLC layer only the upper yellow color filter is visible.

FIG. 4*a* and FIG. 4*c* show the same foil element with a PDLC layer 4 in the closed state (FIG. 4*a*) and in the open state (FIG. 4*c*). The upper color filter layer 2 consists of an arrangement of yellow circles and cyan-colored squares. The lower color filter layer 3 is formed magenta-colored over the whole surface. The edge element 13 surrounding the PDLC layer 4 is formed transparent in this case. FIG. 4*b* shows the appearance for an observer in the closed state of the PDLC layer 4.

Inside the magenta-colored edge 3, the milky-white, cloudy surface of the PDLC layer 4 is visible, on which the multi-colored patterned arrangement of circles and squares of the upper color filter layer 2 is visible. If the PDLC layer 4 is now switched into the transparent state, the representation shown in FIG. 4*d* results: Red circles and blue squares are now to be recognized on a surface colored magenta over the whole surface.

Figure 5A:
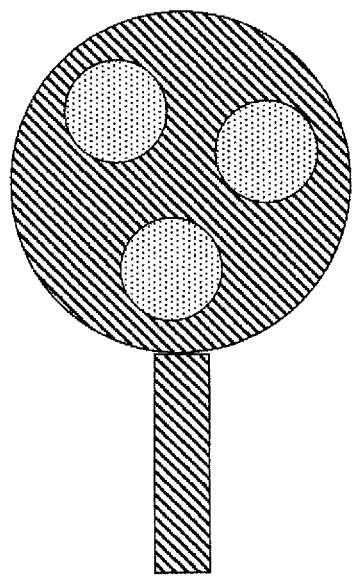
Figure 5B:
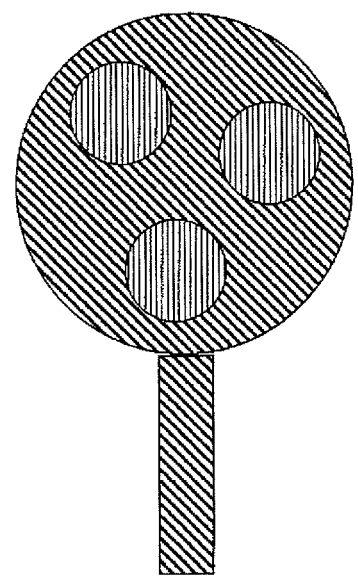

FIG. 5 shows a first representation possibility according to a third embodiment example, based on the layer structure shown in FIG. 4*a*. The patterns of the upper and lower color filters 2, 3 bring about an interplay. The pattern of the upper color filter 2 results in a green apple tree with yellow apples, while the lower color filter 3 has a pattern which results in red apples in front of a colorless background. In the closed state of the PDLC element 4, an observer sees only the upper color filter 2, i.e. the image, shown in FIG. 5*a*, of a green apple tree with yellow, i.e. unripe, apples appears. In the transparent state of the PDLC element 4, a change in the color of the apples from yellow to orange, as shown in FIG. 5*b*, results from the superimposition of the upper color filter 2 and the now likewise visible lower color filter 3. The color change of the apples can thus be used to indicate that a ripening of fruit.

Figure 6A:
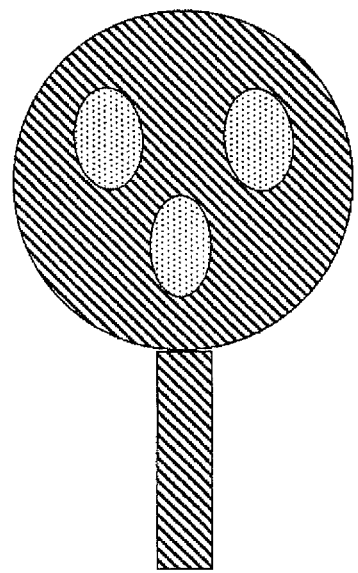
Figure 6B:
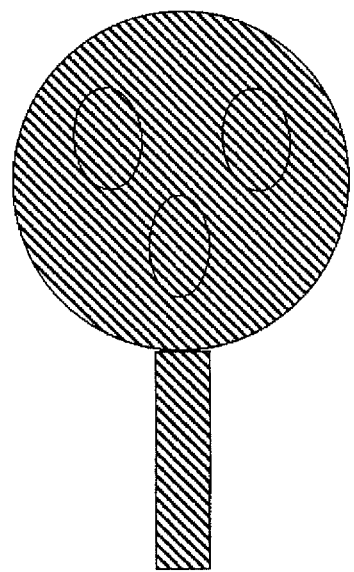
Figure 7A:
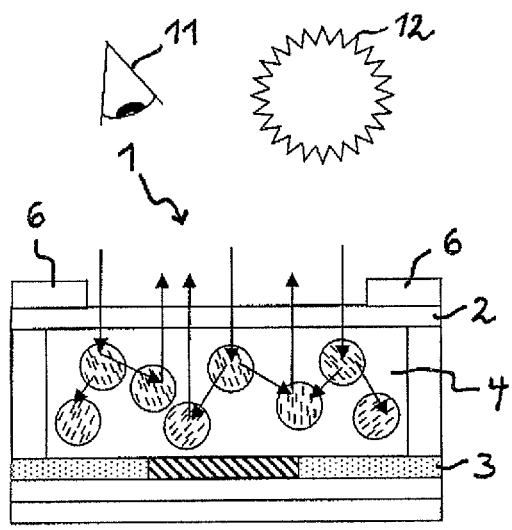
Figure 7C:
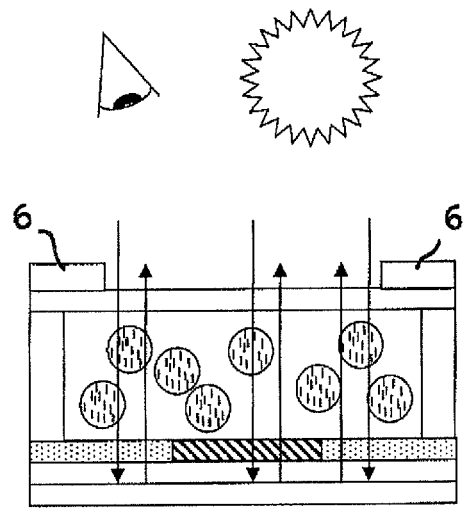
Figure 7B:
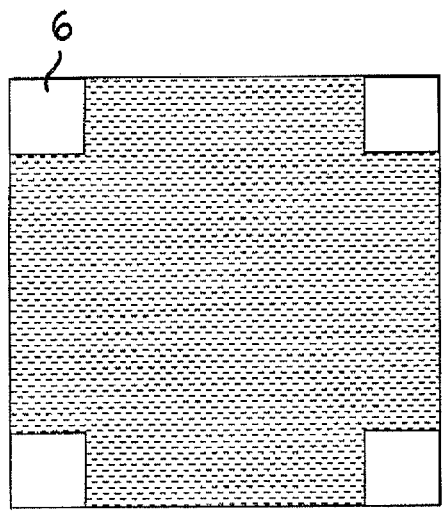
Figure 7D:
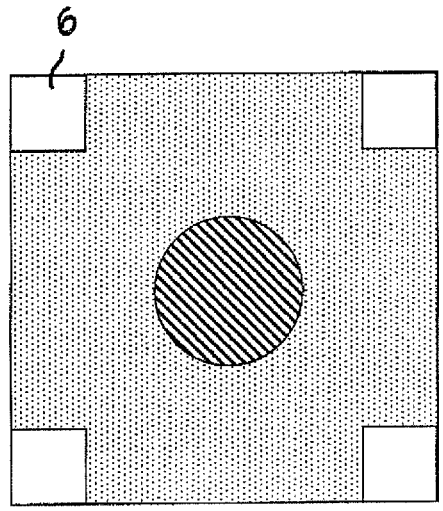
Figure 9A:
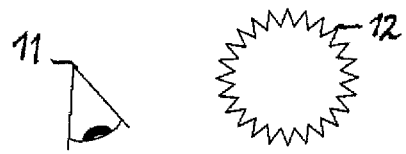
Figure 9B:
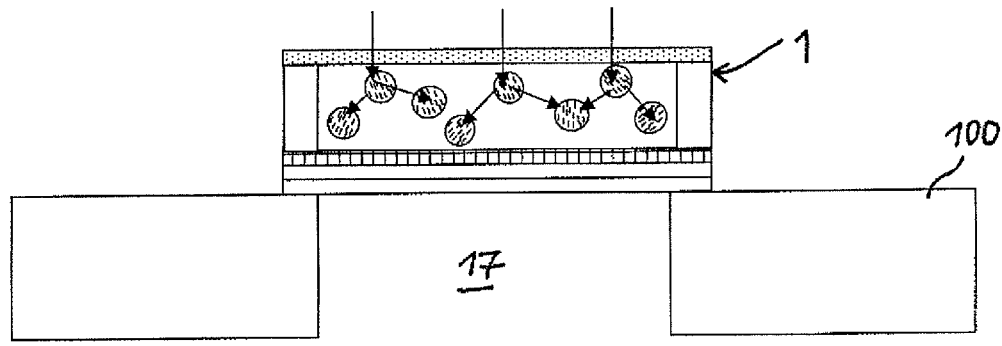
Figure 9C:
Figure 9D:
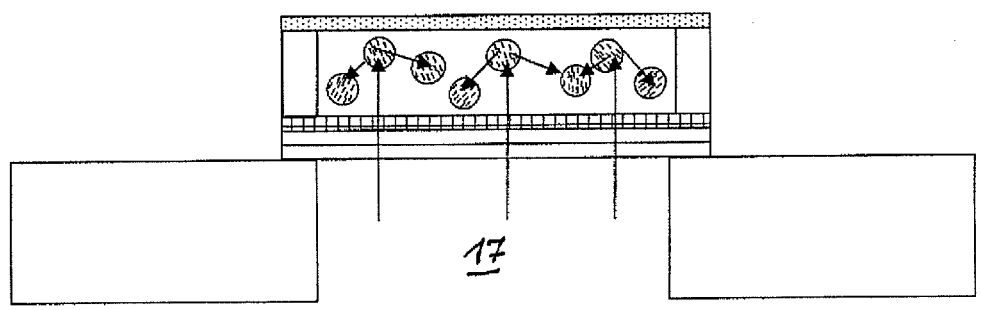
Figure 9D:
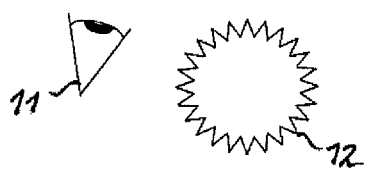

FIG. 6 shows a further representation possibility according to the third embodiment example, with which it is possible to allow parts of the upper pattern to disappear. The representation is likewise based on the layer structure shown in FIG. 4*a*. The upper color filter 2 shows a green tree with yellow lemons. The lower color filter 3 shows a pattern with blue lemons in front of a colorless background. In the closed state of the PDLC element 4, an observer sees only the upper color filter 2, i.e. the image, shown in FIG. 6*a*, of a green lemon tree with yellow lemons appears. If the PDLC element 4 is switched into the transparent state, the lemons change their color from yellow to green because of the superimposition of the upper color filter 2 and now likewise visible lower color filter 3. An observer thus has the impression that the lemons have been picked. In such a case, it is necessary to match the yellow color of the upper filter 2 and the blue color of the lower filter 3 to each other, with the result that the green color, resulting from the combination, in the area of the lemons matches the green color of the upper color filter in the area of the tree as far as possible. Otherwise, the tree green hue of the upper filter 2 and the lemon green hue formed by the superimposition of the upper and lower filters 2, 3 do not match exactly and an observer receives the impression of a green tree with fruit in a green hue differing from this, instead of a uniformly green tree.

FIG. 7 shows a fourth embodiment example with an invariable imprint. FIG. 7a shows a foil body 1 with a transparent, colorless upper color filter 2 and a patterned lower color filter 3. On the side of the upper color filter 2 facing the observer 11, an opaque imprint is arranged in areas in the form of a printed layer 6. In the closed state of the PDLC layer 4, the observer 11, as represented in FIG. 7b, merely sees the printed pattern 6 on a milky-white background of the PDLC layer 4. If the PDLC layer 4 is now switched from the opaque state into the transparent state, as shown in 7c, a superimposition of the printed layer 6 with the pattern of the lower color filter layer 3 results and an observer sees the appearance shown in FIG. 7d: The pattern of the lower color filter 3 forms the background, in this case a yellow background layer with a green dot which is superimposed by the printed image 6 in the foreground.

FIG. 8 shows a fifth embodiment example with a colored PDLC layer 4. The foil body 1 comprises an upper color filter 2, a lower color filter 3 and a PDLC layer 4 arranged therebetween. Due to the coloring of the PDLC layer 4, e.g. with a dye, in the closed state of the PDLC layer 4 an observer 11 sees both the colors of the upper color filter 2 and the color of the PDLC layer 4. In the transparent state of the PDLC layer 4, as shown in FIG. 8c, a superimposition of the two color filter layers 2 and 3 and of the colored PDLC layer 4 results for the observer 11. FIGS. 8e to 8g show examples of an upper color filter 2 (FIG. 8e) in the form of a cyan-colored circle on a transparent colorless background, a yellow PDLC layer 4 (FIG. 8f) and a lower color filter layer 3 (FIG. 8g) in the form of a magenta-colored star on a transparent colorless background. The appearance in the closed state of the PDLC layer 4 is represented in FIG. 8b: a green circle on a yellow background. FIG. 8d shows the appearance in the transparent state of the PDLC layer 4: The area of the overlap of the lower magenta-colored star, the yellow PDLC layer and the cyan-colored circle results in a core area of a star with a gray to black color, a yellow background, green arcs and red points of the star.

FIG. 9 shows a sixth embodiment example in which a multi-layered foil body 1 is arranged over a through window 17 of a security document 100. In this way, the foil body 1 can be observed from both sides, namely both in reflected light and in transmitted light. The security document 100 can be e.g. a banknote. The window 17 can be either an e.g. punched out hole in a paper banknote or a passport page made of paper or a transparent area in a polymer banknote or a smart card. Normally, the foil body 1 is viewed from the front side of the banknote in reflected light, as shown in FIG. 9a. However, the banknote can also be turned over and the back side can likewise be viewed in reflected light, as shown in FIG. 9d. On the other hand, the banknote can also be viewed in transmitted light on the back side, as in FIG. 9b, or in transmitted light on the front side, as shown in FIG. 9c.

FIG. 10 shows a representation possibility, according to the sixth embodiment example, for a banknote window in which the foil body 1 has both color filter layers 2, 3 and printed layers 6, 6' on its upper and lower surface. If the PDLC layer 4 is opaque, the representation shown in FIG. 10b results when the front side is viewed and the representation shown in FIG. 10c results when the back side is viewed. FIG. 10b shows the representation when the front side of the foil body 1 is viewed, wherein only the first printed layer 6 colored as desired and the yellow-colored color filter layer 2 are visible. When the back side is viewed in the opaque state, as represented in FIG. 10c, the second printed layer 6' is recognizable which is visible in front of the pattern of the lower color filter layer 3 and the milky-white background of the "closed" PDLC layer 4. If the PDLC layer 4 is now switched into the transparent state, i.e. "open", the representations shown in FIG. 10e and FIG. 10f result, depending on the viewing side. FIG. 10e shows the representation when the foil body 1 is viewed from the front side, i.e. looking onto the first color filter layer 2. In the holes of the first printed layer 6 the second printed layer 6' is recognizable through the yellow color filter layer 2, as well as the pattern of the lower color filter layer 3. When viewed from the back side, i.e. looking onto the lower color filter layer 3, as represented in FIG. 10f, the second printed layer 6' is recognizable in the foreground, as well as the first printed layer 6 through the yellow color filter layer 2. In front of the background of the first color filter layer 2, the lower color filter layer 3 is recognizable in the foreground in the form of a green circle.

Figure 10A:
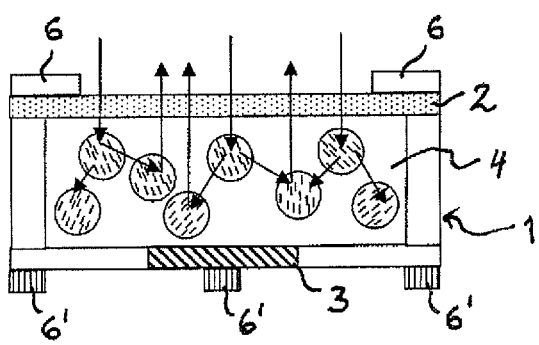
Figure 10D:
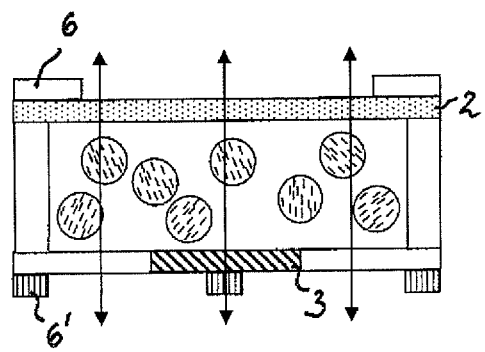
Figure 10B:
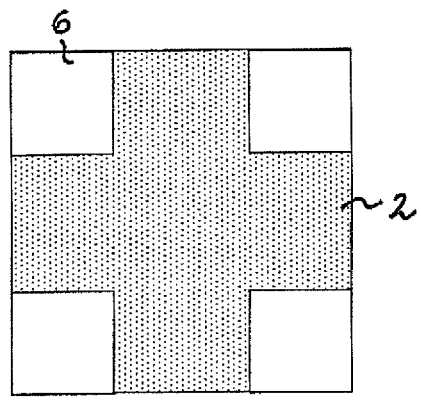
Figure 10E:
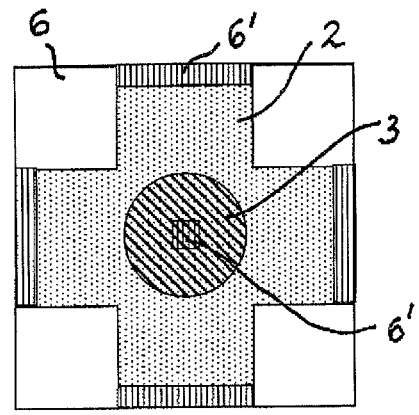
Figure 10C:
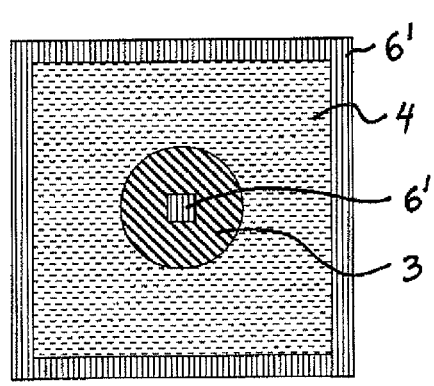
Figure 10F:
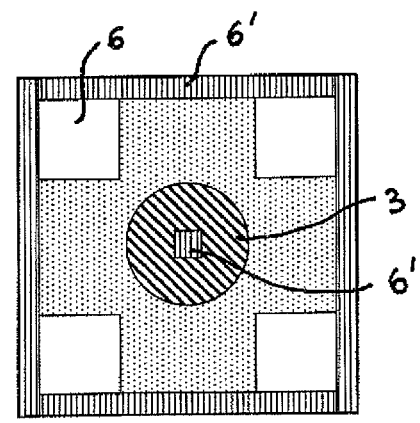
Figure 11A:
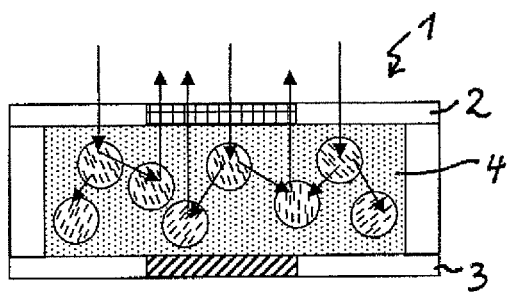
Figure 11D:
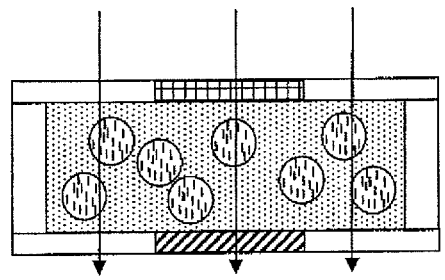
Figure 11G:
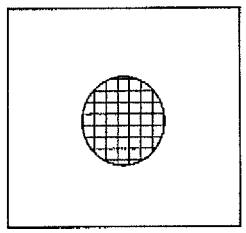
Figure 11H:
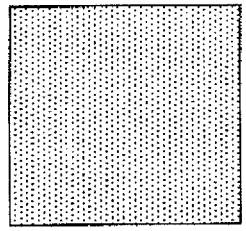
Figure 11I:
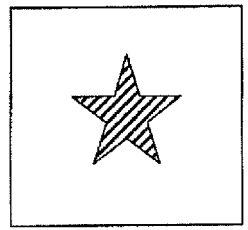
Figure 11B:
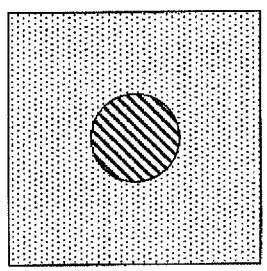
Figure 11E:
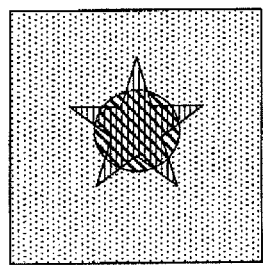
Figure 11C:
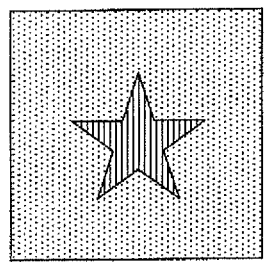
Figure 11F:
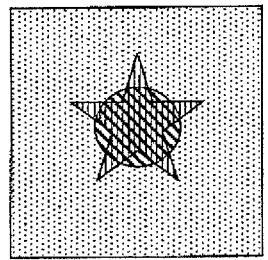

FIG. 11, similarly to FIG. 10a, shows a foil body 1 which can be viewed from both sides, wherein however the PDLC layer 4 is also colored and invariable printed layers are absent. FIG. 11g shows the first color filter 2 which displays a cyan-colored circle on a transparent colorless background. FIG. 11h shows a yellow-colored PDLC layer 4 and FIG. 11i shows the lower color filter layer 3 with a magenta-colored star on transparent, colorless background. In the opaque state (FIG. 11a), the foil body 1 can be viewed both from the upper side (FIG. 11b) and from the back side (FIG. 11c). FIG. 11b shows the foil body 1 when viewed in the opaque state from the front side, i.e. looking onto the first color filter 2: The observer recognizes a green circle in front of the yellow background of the yellow PDLC layer 4 due to the superimposition of the cyan-colored circle of the color filter and the yellow-colored PDLC layer 4. When viewed from the back side, i.e. looking onto the second color filter 3, the observer, as shown in FIG. 11c, sees a red star in front of a yellow background. If the PDLC layer 4 is now switched into the transparent state, as indicated in FIG. 11d, the observer, looking onto the first color filter layer 2, sees an inner area of a star in gray to black with red star points as well as green arcs on a yellow background (FIG. 11e). Nor does this image change with a direction of view onto the lower color filter layer 3, as represented in FIG. 11f.

Figure 12A:
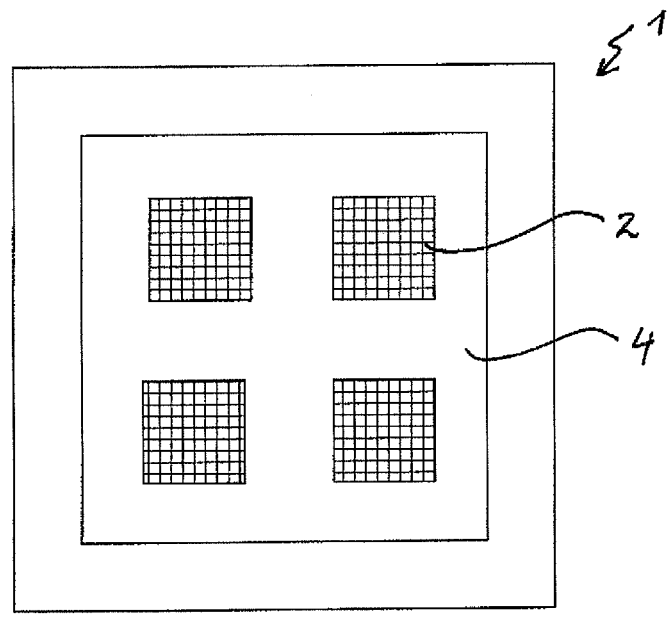
Figure 12B:
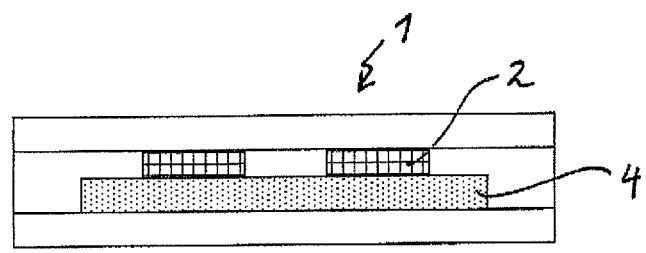

FIG. 12 shows a foil body without PDLC layer. FIG. 12a shows a patterned upper color filter layer 2 in the form of yellow squares. Underneath this, an electrochromic layer or an organic LED layer is arranged as change layer 4 which, however, is not formed as a PDLC layer. In the case that the change layer 4 is formed as an electrochromic layer, the electrodes provided for applying a voltage rest directly against it. If no voltage is applied to the electrochromic layer or organic LED layer 4, either it is colorless or it has a first color. If a voltage is applied to the electrochromic layer or organic LED layer 4, it changes color into a second color, e.g.

blue. If the pattern of the color filter layer 2 overlaps the electrochromic layer 4, as shown in FIG. 12a and FIG. 12b, a combination of both colors, as shown in FIG. 12b, results when a voltage is applied. If the pattern of the color filter layer does not overlap the electrochromic layer or organic LED layer 4, only the second color of the electrochromic layer or organic LED layer 4 is visible for an observer. If for example the color of the color filter layer 2 is yellow and the electrochromic material or organic LED material 4 changes from colorless (no voltage) to blue (voltage applied), when the electrochromic layer or organic LED layer 4 is switched the result is a change from yellow to green in the overlapping areas and a change from white to blue in the non-overlapping areas.

The lower electrode 16 can be reflective and substantially opaque or the lower electrode 16 can be reflective and semi-transparent, whereby additional advantages are achieved or further optical effects can be achieved in cooperation with a bright, in particular white, substrate lying underneath it, optionally also with colored imprinting.

FIGS. 13 and 14 show designs of an embodiment with at least one cholesteric liquid crystal layer. One or both of the color filter layers 2 and 3 are formed by cholesteric liquid crystal layers which produce interference colors dependent on the viewing angle. A pattern in the form of a star on a transparent or white background is printed underneath the two color filter layers 2 and 3 with a black or dark, in particular dark gray, dark blue, dark green, dark red printer ink, as shown in FIG. 13b. The use of a black printer ink can produce a higher contrast, but the alternative, dark colors can bring about additional attractive color effects. Instead of the black or dark printer ink, the pattern can also be formed by a diffractive structure 18 on a reflective, e.g. metallic, background 5, as represented in FIG. 13e.

Figure 13A:
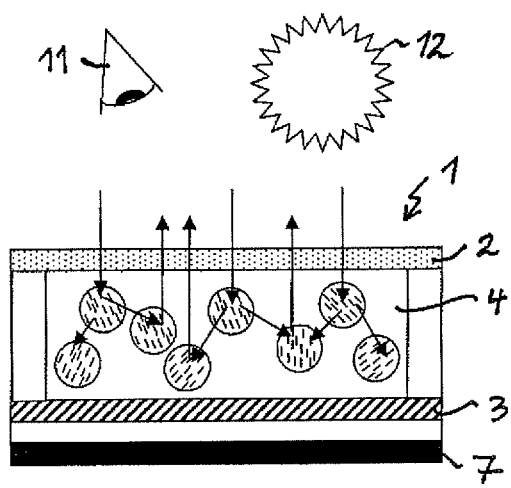
Figure 13B:
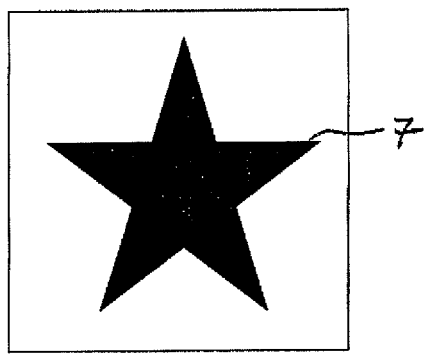
Figure 13C:
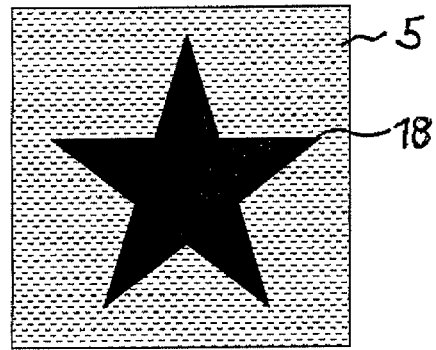
Figure 13D:
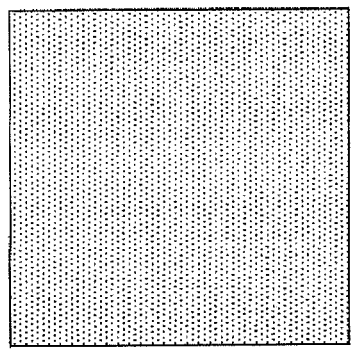
Figure 13E:
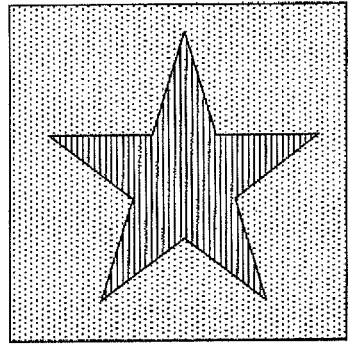

If, as shown in FIG. 13a, the upper color filter layer 2 is now formed as a conventional yellow color filter layer and the lower color filter layer 3 is formed by a cholesteric liquid crystal layer, in the closed state of the PDLC layer 4 the representation, shown in FIG. 13d, of a yellow surface results because the observer 11 is looking onto the upper color filter layer 2. If the PDLC layer 4 is switched into a transparent state, the representation shown in FIG. 13e, in which a red/green star, according to the viewing angle onto the cholesteric liquid crystal layer 3, is recognizable in front of a yellow background, results for the observer.

Figure 14A:
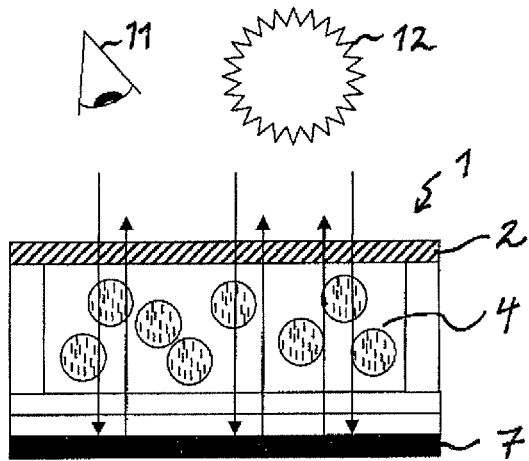
Figure 14B:
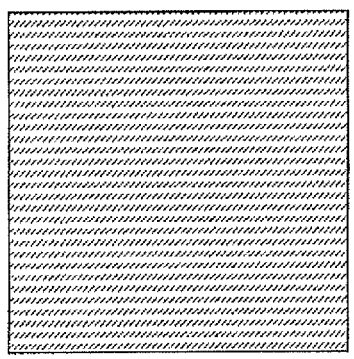
Figure 14C:
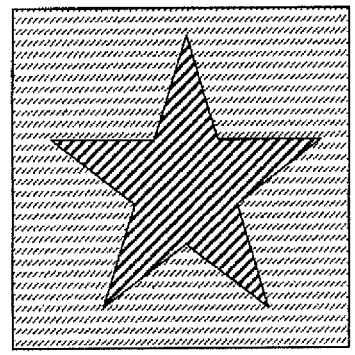

FIG. 14a shows an alternative arrangement of a cholesteric liquid crystal layer in which the upper color filter layer 2 is present in the form of a cholesteric color filter layer and no further color filter layer is present. The dark background layer 7 is formed analogously to the representations shown in FIG. 13b and FIG. 13c. In the opaque state, an observer sees the image shown in FIG. 14b, i.e. the foil body appears slightly or faintly magenta-colored. When the PDLC layer 4 is switched into the transparent state, the image shown in FIG. 14c results for the observer, i.e. he sees a deeply or intensely magenta-colored star in front of a slightly or faintly magenta-colored background.

Figure 15A:
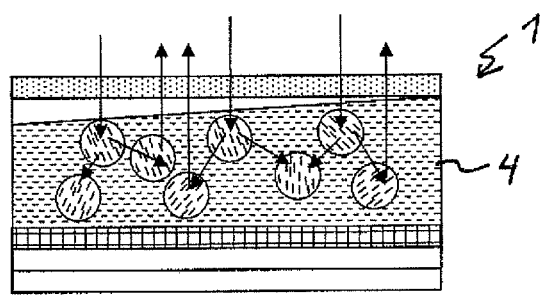
FIG. 15 a further embodiment example of the foil body with PDLC layers of varying thickness, FIG. 16 a security element on a security document, and FIG. 17 a transfer foil.
Figure 15B:
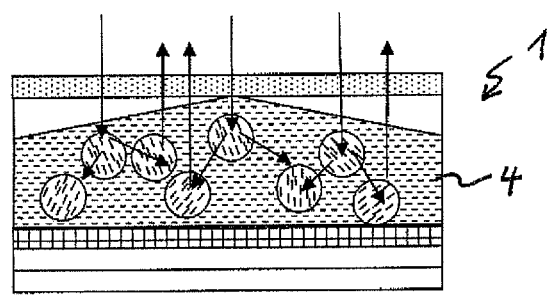

FIG. 15 shows foil bodies 1 with PDLC layers 4 of varying thickness. In the embodiment example shown in FIG. 15a, the thickness of the PDLC layer 4 varies linearly diagonally over the foil body, from a first, smaller thickness at the left-hand layer edge to a second, larger thickness at the right-hand layer edge. In the embodiment example shown in FIG. 15b, the thickness decreases from the center towards the edges of the foil body 1. As thicker PDLC layers require more voltage in order to switch from the opaque into the transparent state, color variations which change depending on voltage, e.g. a color wave changing from yellow to green which, with increasing voltage, travels over the visible area of the foil body 1, can be achieved by changing the thickness of the PDLC layer 4.

Figure 16:
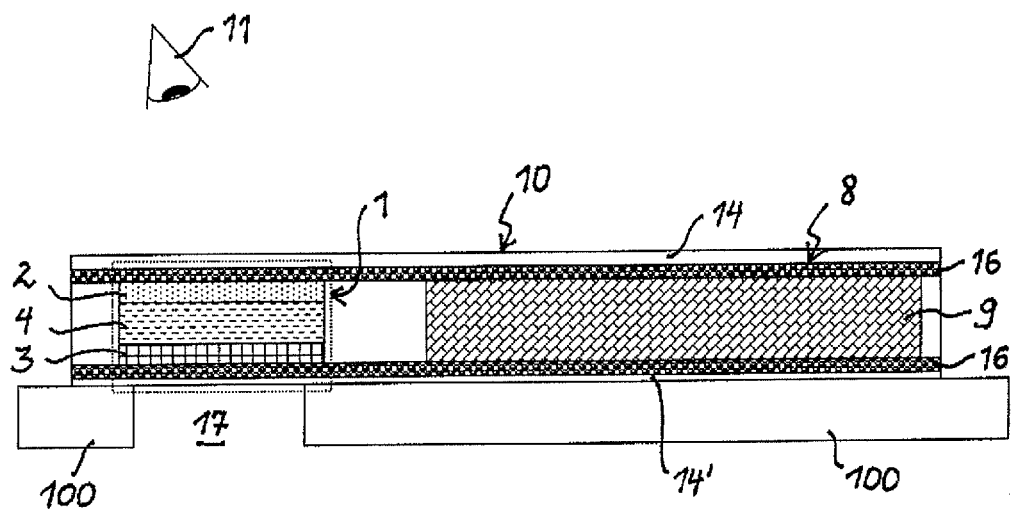

FIG. 16 shows a security document 100, e.g. a paper banknote, in which a window opening 17 that preferably completely penetrates the paper substrate of the document 100 is formed, e.g. by being punched out. The security document has a thickness of at most 200 μm, in particular a thickness in the range of from 50 to 200 μm, here preferably in the range of from 85 to 140 μm.

A security element 10 which comprises a multi-layered foil body 1 and a piezoelectric energy source 8 is fixed on one side of the document 100, e.g. by means of an adhesive layer, not shown. The foil body 1, which comprises an upper and a lower color filter layer 2, 3 and a PDLC layer 4 arranged therebetween, is arranged such that it closes the window opening 17. The piezoelectric energy source 8 contains a layer 9 of piezoelectric material, e.g. PVDF (=polyvinylidene fluoride), against both sides of which in each case an is electrode layer 16 rests.

The electrode layers have a layer thickness in the range of from 1 nm to 500 nm, preferably in the range of from 10 nm to 500 nm. The electrode layers can be formed opaque or at least locally transparent. To form the electrode layers, metals or metal alloys, such as aluminum, silver, gold, chromium, copper and the like, conductive non-metallic inorganic materials such as ITO and the like, carbon nanotubes, and conductive polymers, such as PEDOT (=poly(3,4-ethylenedioxythiophene)), PANI (=polyaniline), and the like have proved their worth.

The formation of the electrode layers takes place, in particular in the case of the formation of metallic or non-metallic inorganic electrode layers, preferably by vapor deposition or sputtering, or in particular in the case of the formation of polymeric electrode layers by current printing processes, such as screen printing, inkjet printing, relief printing, gravure printing or an application using a doctor blade. However, the use of a transfer foil to form electrode layers by means of hot or cold stamping is also possible.

These electrode layers 16 form an electrically conductive connection through the security element 10 up to the foil body 1, where they each run between one of the opposing side of a PDLC layer 4 and one of the adjacent color filter layers 2, 3.

Towards the outside, the security element 10 is covered by a transparent protective layer 14. The protective layer is preferably formed as a carrier film, which is self-supporting, or as a protective varnish layer, which is not self-supporting because of its small layer thickness. The protective layer 14 is preferably formed transparent with color. The protective layer is formed in particular from PET, PEN (=polyethylene naphthalate), PE (=polyethylene), PI=(polyimide), PP (=polypropylene), PC or PTFE (=polytetrafluoroethylene).

An auxiliary layer 14' in the form of a leveling layer that levels out the heights runs between the piezoelectric energy source 8 and the document.

It has proved worthwhile if a polymer, in particular of the polyvinylidene fluoride (=PVDF) type, is used as piezoelectric material. However, other piezoelectric materials, such as polyamides, polyurethanes, fluoropolymers and in particular copolymers derived therefrom as well as ferroelectric liquid crystal elastomers can also be used. The layer of piezoelectric material preferably has a layer thickness of at most 200 μm, preferably of at most 30 μm, in particular of at most 5 μm. For ID documents such as a PC passport data page, layer thicknesses in the range up to 200 μm, preferably up to 100 μm, have proved to be practicable. Such thin layers of piezoelectric material can be produced in particular by printing in one or more runs, wherein the ability to generate an electric voltage when a bending load is applied is surprisingly preserved when there is a suitable rigidity.

It is particularly preferred if the change layer 4 formed as a PDLC layer becomes transparent under the action of the electric field which is generated by the piezoelectric energy source 8 by bending same between the first and the second electrode layer 16. However, the energy source can be activated not only by bending, but also thermally via a temperature gradient which is applied over the layer of piezoelectric material.

In the foil body 1 the optical representations changing in color, as described above, can be brought about by the activation of the energy source 8. The read-out of this optical information takes place in particular visually and without further aids. The optical representations produced by the foil body 1 can be observed from the top side 2 of the foil body 1, but also from the bottom side 2 of the foil body 1 because of the window 17.

Figure 17:
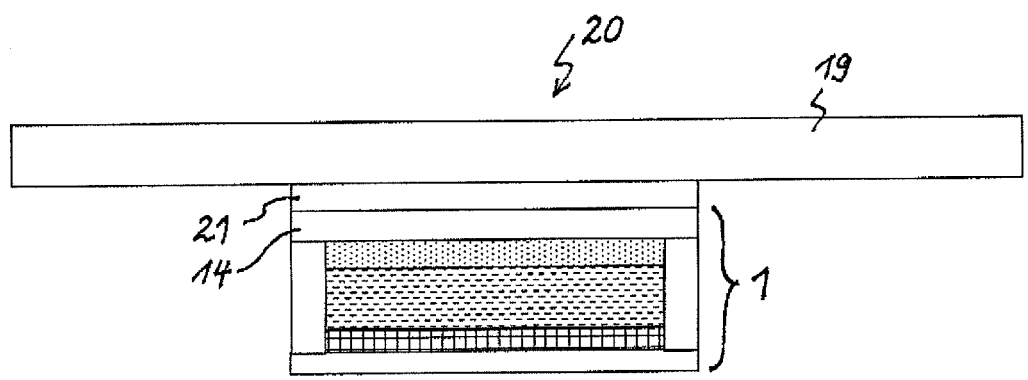

FIG. 17 shows a transfer foil 20. It has proved worthwhile if the foil body 1 is provided on a transfer foil 20, with the result that an application of the security element 10 to a security document 100 can take place by means of stamping. Such a transfer foil 20 has at least one foil body 1 according to the invention, wherein the at least one foil body 1 is arranged on a carrier foil 19 of the transfer foil 20 and can be detached from this.

Starting from the carrier foil 19 of the transfer foil 20, there is usually a detachment layer 21 here in order to be able to detach the foil element 1 from the carrier foil 19 of the transfer foil 20 after stamping. The optional transparent protective layer 14 formed as a protective varnish layer and furthermore the remaining structure of the foil body 1 is preferably present on a side of the detachment layer 19 facing away from the carrier foil 19 of the transfer foil 20.

The foil body 1 can be fixed to the security document 100 by means of an adhesive layer, in particular made of a cold or hot adhesive. However, the adhesive layer can also already be formed by a carrier film which adjoins the foil body 1.

List of Reference: Numbers 1 foil body
2 color filter layer, first
3 color filter layer, second
4 change layer
5 reflective layer
6 invariable layer
7 dark layer
8 piezoelectric energy source
9 layer of piezoelectric material
10 security element
11 observer
12 light source
13 edge element
14 auxiliary layer
15 LC droplets
16 electrode
17 window
18 diffractive layer
19 carrier foil
20 transfer foil
21 detachment layer
100 security document

The invention claimed is:

1. A multi-layered foil body for marking a security document, in particular a banknote or an ID document, which has at least one color filter layer and at least one change layer with an electrically controllable transmittance and/or an electrically controllable color, which layers at least partially overlap each other,
   wherein the foil body comprises two differently colored color filter layers and a change layer arranged therebetween with an electrically controllable transmittance, and
   wherein one of the two color filter layers is formed colored in a pattern and the other forms a color surface that is homogeneous over the whole surface.

2. A foil body according to claim 1, wherein the at least one change layer has liquid crystals which can be aligned in an electric field.

3. A foil body according to claim 1, wherein the at least one change layer is formed from at least one PDLC layer.

4. A foil body according to claim 3, wherein the PDLC layer is colored.

5. A foil body according to claim 1, wherein a pattern with differently colored pattern elements is formed in at least one of the two color filter layers.

6. A foil body according to claim 1, wherein the foil body has a reflective layer which is arranged behind the at least one color filter layer and the at least one change layer in relation to an observer.

7. A foil body according to claim 1, wherein the foil body has at least one printed color layer.

8. A foil body according to claim 1, wherein at least one of the at least one color filter layers is formed as a cholesteric liquid crystal layer.

9. A foil body according to claim 8, wherein a dark or scattering layer is formed, in the form of a pattern, behind the cholesteric liquid crystal layer in relation to an observer.

10. A foil body according to claim 1, wherein the thickness of the change layer varies.

11. A security element with at least one foil body according to claim 1 and at least one energy source that controls the change layer.

12. A security element according to claim 11, wherein the energy source is a piezoelectric energy source with at least one layer of piezoelectric material.

13. A security document, in particular a banknote or an ID document, with at least one foil body according to claim 1.

14. A security document according to claim 13, wherein the foil body is arranged at least in areas in a transparent area of the security document.

15. A transfer foil with at least one foil body according to claim 1, wherein the at least one foil body is arranged on a carrier foil of the transfer foil and can be detached from the latter.

16. A method for producing a multi-layered foil body according to claim 1, wherein the color filter layer and/or the at least one change layer of the foil body is formed by printing onto a carrier foil.

* * * * *